United States Patent [19]

McCurley

[11] 4,441,544
[45] Apr. 10, 1984

[54] WASTE HEAT RECOVERY SYSTEM HAVING THERMAL SLEEVE SUPPORT FOR HEAT PIPE

[75] Inventor: Jack McCurley, Dallas, Tex.

[73] Assignee: Q-dot Corporation, Garland, Tex.

[21] Appl. No.: 354,745

[22] Filed: Mar. 4, 1982

Related U.S. Application Data

[62] Division of Ser. No. 165,059, Jul. 1, 1980.

[51] Int. Cl.$^3$ .............................................. F28F 9/10
[52] U.S. Cl. .................... 165/1; 29/157.3 R;
29/157.4; 122/33; 122/511; 122/512; 165/76;
165/135; 165/104.21; 285/47; 285/221;
285/137 R
[58] Field of Search ............... 165/135, 76, 104.21,
165/81–83, DIG. 12, 47, 1; 432/91; 122/33;
285/47, 137 R, 219–221, 158; 29/157.3 R,
157.4; 122/511, 512

[56] References Cited

U.S. PATENT DOCUMENTS

| | | | |
|---|---|---|---|
| 3,854,454 | 12/1974 | Lazaridis | 122/33 |
| 3,945,431 | 3/1976 | Straub | 29/157.4 |
| 4,079,967 | 3/1978 | Schoessow | 285/47 |
| 4,192,374 | 3/1980 | Hayden et al. | |

FOREIGN PATENT DOCUMENTS

| | | | |
|---|---|---|---|
| 53-67152 | 6/1978 | Japan | 165/104.21 |
| 53-67153 | 6/1978 | Japan | 165/104.21 |
| 54-97862 | 8/1979 | Japan | 165/104.21 |
| 171441 | 5/1960 | Sweden | 285/47 |

Primary Examiner—Albert W. Davis, Jr.
Attorney, Agent, or Firm—Hubbard, Thurman, Turner & Tucker

[57] ABSTRACT

A system for recovering waste heat from a stream of heated gas is disclosed. The system includes a convection heat transfer chamber, a boiler tank, and a plurality of heat pipes thermally interconnecting the convection heat transfer chamber with the boiler tank. Each of the heat pipes includes an evaporator section which is disposed in heat transfer relation with a stream of heated gas flowing through the convection heat transfer chamber, and a condenser section disposed in heat transfer relation with a volume of water contained within the boiler tank. The boiler tank is provided with a header plate having an array of heat pipe openings through which the heat pipes project. A heat pipe support sleeve is received in each heat pipe opening in sealed engagement with the header plate, with the heat pipes projecting through the support sleeves and thermally interconnecting the convection heat transfer chamber with the boiler tank. An intermediate portion of each heat pipe is received in sealed engagement with its associated support sleeve. In a preferred embodiment, heat transfer through the support sleeve is minimized in an arrangement in which each heat pipe opening is reduced by a stepped bore with the support sleeve connected in threaded, sealed engagement with the stepped bore. Furthermore, in this arrangement, the support sleeve has swaged end portions which project beyond the header plate and engage the heat pipe on opposite sides at points which are remote with respect to the support sleeve/header plate interface. One of the swaged end portions is sealed against the heat pipe in a fluid-tight union within the boiler tank. The support sleeve is radially spaced with respect to the heat pipe, and is also radially spaced with respect to the heat pipe opening whereby heat transfer through the walls of the heat pipe to the support sleeve and to the header plate is minimized by concentric annular air gaps.

5 Claims, 9 Drawing Figures

WASTE HEAT RECOVERY SYSTEM HAVING THERMAL SLEEVE SUPPORT FOR HEAT PIPE

This is a divisional of application Ser. No. 165,059 filed July 1, 1980.

BACKGROUND OF THE INVENTION

1. Field of the Invention

The present invention relates generally to heat exchange systems, and in particular, to a gas-to-water heat recovery system which utilizes an array of heat pipes for collecting heat from a stream of heated gas and transferring the heat into a volume of water for the production of steam.

2. Description of the Prior Art

Heat recovery from industrial waste gas sources presents an ever increasing opportunity for economical operation of thermal systems. The economic advantage from any form of heat recovery depends upon the availability and cost of fuels. Obviously, savings from heat recovery increase as fuel costs rise. As the cost of energy constantly increases, various systems and methods are being devised to recover and transfer thermal energy which would otherwise be lost.

Conventional heat exchange apparatus operates in several heat recovery modes including air to gas, gas to water, and gas to organic fluids. The selection of the mode of heat recovery depends upon the characteristics of the application, the processes used by the particular industrial facility, and the economic need for a given service. For example, steam can be generated at low pressure for heating or absorption air conditioning applications, at medium pressures for processing, or at higher pressures with or without superheat for electrical power generation.

The recovery of heat energy by the generation of either high pressure or low pressure steam is probably the most common means of fuel and energy conservation because steam carries tremendous heat energy per unit weight, consisting of sensible and latent heat. Various types of heat recovery boilers are available for the recovery of heat energy by the generation of either high pressure or low pressure steam. Examples of conventional heat recovery boilers include units of straight tube banks attached to fixed or floating headers and units of serpentine (return bend) elements. The circular coil type and the horizontal serpentine element type require forced recirculation. Vertical tube units may operate in either forced or natural circulation modes. Larger low pressure heat recovery applications usually employ the natural circulation system, commonly of the two drum variety.

In the operation of conventional waste heat boilers, the rate of heat transfer from waste gases to the boiler water depends upon the temperature and specific heat of the gases, the velocity and direction of the gases over the heat absorbing surfaces of the boiler, and the cleanliness of the surfaces. For proper heat transfer from the waste gases to the boiler water there must be sufficient stack or an induced draft fan to overcome the draft losses due to the required flow of the gases over the heat absorbing surfaces with an allowance for fouling of these surfaces. Compared with direct firing arrangements, the gas temperatures are generally lower and consequently the radiation component in the heat transfer mechanism is also lower. Therefore, the tendency with waste heat boilers is to design for higher gas velocity over the tubes in order to increase the convection component of heat transfer. However, a significant number of industrial processes generate a substantial amount of heated waste gas which is only available for recovery of thermal energy at relatively low flow velocities. Consequently, there exist a number of industrial processes in which recovery of waste heat by conventional heat exchangers is relatively inefficient because of the low flow velocities involved. In view of the constantly increasing cost of energy, there is a continuing need for new and improved systems for recovering waste heat which operate effectively at relatively low flow velocities.

The use of heat pipes in combination with a steam boiler offers several advantages over conventional heat exchange arrangements. For example, the transducer characteristic of the heat pipe permits collection of heat from a diffused source such as low velocity waste gas and transfer of the heat into a concentrated thermal sink such as a volume of water. Sealing a heat pipe through a single or double wall header plate provides complete isolation of one fluid stream from the other. Because of the single point connection, both the evaporator and condenser ends of the heat pipe extend freely thereby minimizing stress problems due to thermal expansion and contraction. Furthermore, the outside of the heat pipe is available in both fluid streams for cleaning, for extended surface fin structure, or for special surface preparation to enhance heat transfer.

In some conventional heat exchanger arrangements in which heat pipes are utilized for transferring waste heat from a heated gas stream to a steam boiler, the heat transfer efficiency has been utilized by losses associated with sealing the heat pipes through the header plate in the wall of the boiler tank. Unacceptable levels of heat transfer have occurred through the walls of the heat pipe at the heat pipe/header plate interface because of the large interface area involved. A relatively large heat transfer interface area between the heat pipe and the header plate has resulted in part because the header plate must be relatively thick as compared with the thickness of the steam boiler walls in order to meet the strength and pressure requirements and other provisions of the ASI code for boiler construction. It is, therefore, the principal object of the present invention to provide a heat pipe support arrangement which provides mechanical support for a heat pipe, provides a fluid-tight seal for the interior of a steam boiler, and which minimizes heat transfer from the heat pipe through the header plate.

SUMMARY OF THE INVENTION

The present invention concerns a method and apparatus for utilizing heat pipes in combination with a steam boiler for the recovery and transfer of thermal energy in a waste heat recovery system which operates effectively at low flow velocities. Heat pipes normally comprise a sealed envelope containing a working fluid having both a liquid phase and a vapor phase in the desired range of operating temperatures. When one portion of the heat pipe is exposed to a relatively higher temperature, it functions as an evaporator section. The working fluid is vaporized in the evaporator section and flows in the vapor phase to the relatively lower temperature section of the envelope, which becomes a condenser section. The working fluid is condensed in the condenser section resulting in the transfer of thermal energy due to the phase changes of the working fluid. The condensed working fluid is then transported in a liquid phase back to the evaporator section where the process is repeated.

Heat pipes are utilized in the present invention to recover and transfer heat energy from a stream of heated waste gas to a volume of water disposed in a boiler for the production of heated water under pressure or for the production of steam. The stream of heated waste gas is caused to flow through a convection heat transfer chamber where it is contacted by the evaporator portion of one or more heat pipes which connect the convection heat transfer chamber in thermal communication with a boiler containing a volume of water. The condenser end of each heat pipe projects through a header plate forming a side portion of the boiler tank and is submerged in thermal relation with the volume of water. A working fluid contained within each of the heat pipes is characterized by a thermodynamic cycle in which the working fluid assumes the vapor phase in response to the transfer of heat energy from the heated gas phase through the evaporator section of the heat pipe, whereupon it flows from the evaporator section to the condenser section and assumes the liquid phase in the condenser section in response to the transfer of its heat energy through the condenser to the volume of water.

The heat pipes are supported by a thermal sleeve arrangement which provides a fluid-tight seal and also minimizes the transfer of heat from the heat pipe through the header plate. According to a preferred arrangement, the header plate has heat pipe openings each reduced by a stepped bore and the support sleeve projects through the heat pipe opening and is coupled in sealed engagement with the stepped bore. The heat pipe projects through the support sleeve and is coupled in sealed engagement with the support sleeve. In this indirect support arrangement, the support sleeve is provided with swaged end portions which engage the heat pipe on opposite sides of the header plate, with one of the swaged end portions being sealed against the heat pipe in a fluid-tight union at a point remote from the interface of the sleeve and stepped bore within the boiler tank. The inside diameter of the support sleeve is larger than the outside diameter of the heat pipe whereby the heat pipe and support sleeve are separated by an annular air gap. Additionally, the outside diameter of the support sleeve is smaller than the inside diameter of the heat pipe opening whereby the support sleeve and header plate are separated by an annular air gap along the depth of the heat pipe opening. The thermal sleeve is preferably provided with a tapered intermediate section which is threaded for engaging a corresponding tapered and threaded portion of the stepped bore. The swaged end of the thermal sleeve which projects into the boiler tank is preferably sealed against the condenser portion of the heat pipe by a weld bead.

The thermal sleeves are assembled in sealed engagement to the heat pipe prior to installation. During installation, the thermal sleeves serve as a guide as the heat pipes are inserted into the boiler tank. The thin wall of the support sleeve substantially limits heat transfer from the heat pipe to the header plate. The concentric annular air gaps interposed between the heat pipe and the thermal sleeve and between the thermal sleve and the header plate also substantially reduce heat transfer from the heat pipe through the header plate. The single point connection of the swaged sleeve end portion permits both the condenser and evaporator end portions of the heat pipes to extend freely thereby minimizing stress problems due to thermal expansion and contraction. Additionally, the threaded, tapered union of the thermal sleeve with the stepped bore of the header plate produces a sealed union which complies with the strength and pressure requirements of the ASI code for boiler construction.

The novel features which characterize the invention are defined by the appended claims. The foregoing and other objects, advantages and features of the invention will hereinafter appear, and for purposes of illustration of the invention, but not of limitation, an exemplary embodiment of the invention is shown in the appended drawing.

BRIEF DESCRIPTION OF THE DRAWINGS

FIG. 9 is a perspective view of the header plate of the invention.

DETAILED DESCRIPTION

In the description which follows and in the several figures of the drawings, like parts are marked with the same reference numerals respectively.

Figure 1:
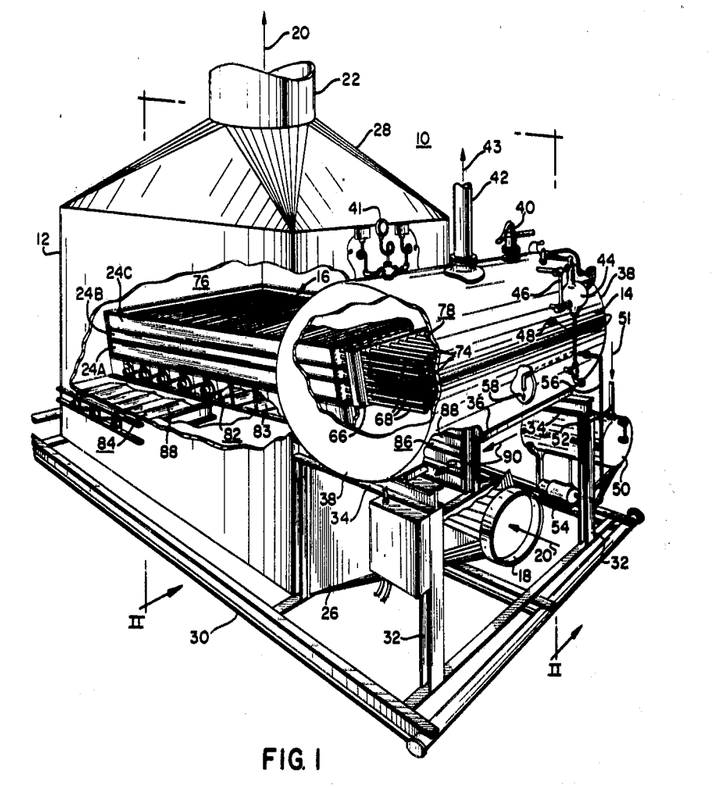
FIG. 1 is a perspective view of a waste heat recovery system constructed according to the teachings of the invention.
Figure 2:
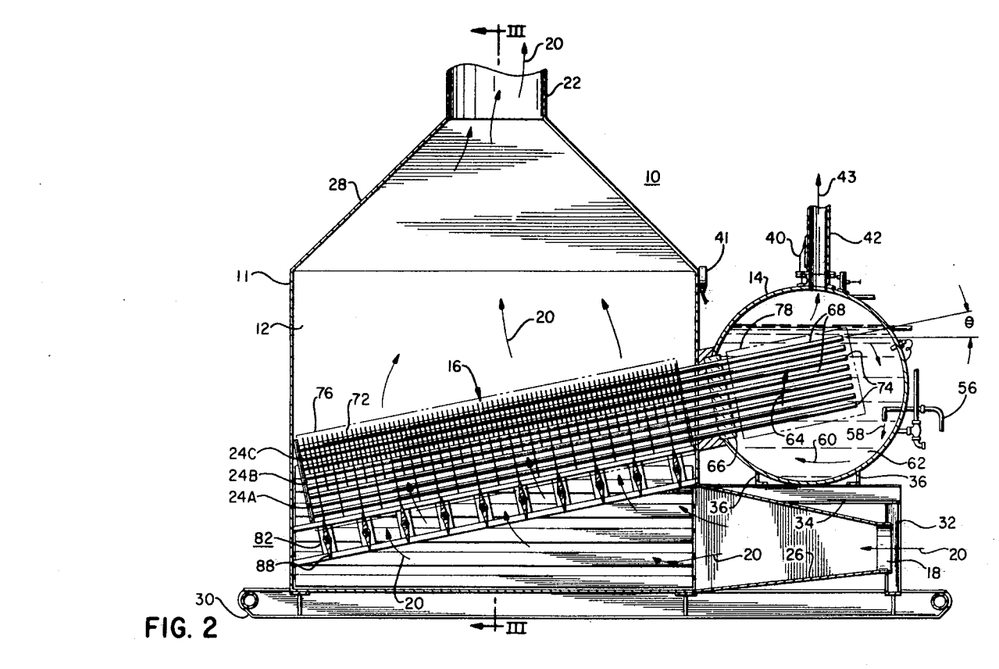
FIG. 2 is a left side view, in section, taken along the lines II—II of FIG. 1.
Figure 3:
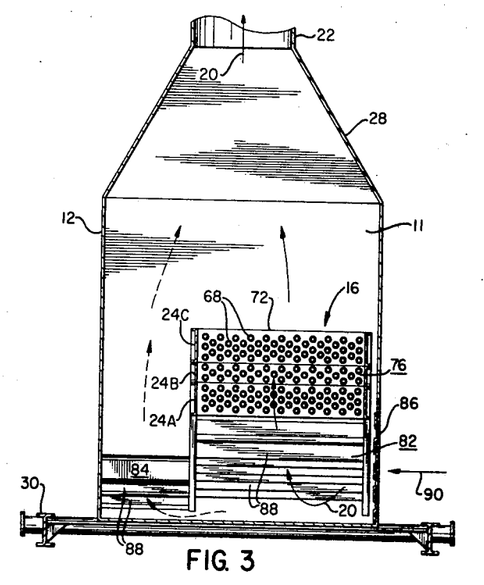
FIG. 3 is a sectional view taken along lines III—III of FIG. 2.

Referring now to FIGS. 1-3, a heat recovery system which is constructed according to the teachings of the present invention is indicated generally by the reference numeral 10. The heat recovery system 10 includes a housing 11 which encloses a convection heat transfer chamber 12, a steam boiler tank 14, and a heat pipe assembly 16 which interconnects the convection heat transfer chamber 12 and steam boiler tank 14 in thermal communication with each other. The housing 11 is equipped with an inlet port 18 through which a stream of heated waste gas, indicated by the arrow 20, flows into the convection heat transfer chamber 12 and across the heat pipe assembly 16 where thermal energy is transferred. After the thermal energy transfer has occurred, the exhaust gas flow is discharged through an exhaust port 22 to an exhaust stack by means of an induced draft fan (not shown).

The bottom region of the boiler tank 14 conveniently serves as a "mud drum" volume, and additional flush-clean holes may be provided at various places in the tank to permit cleaning without complete disassembly. One of the end cover plates can be sealed against the end of the boiler tank 14 by a bolted flange construction which allows quick removal for cleaning and inspection.

The source for the heated waste gas stream 20 may be from any industrial process but for purposes of the present discussion it will be assumed to be the exhaust from a gas turbine which is used in a total energy system to drive an alternator or a mechanical refrigeration compressor. Such a total energy system might be used to provide all power, light, heating and cooling for a hotel, school, shopping center or hospital. Gas turbine exhaust temperatures are typically in the range of 750° F. to 1,000° F. and therefore may be considered to be in the medium temperature range, requiring no special materials or alloy steels in the heat exchanger 16.

The housing 11 and convection heat transfer chamber 12 are generally rectangular in design having a relatively greater width than depth to accommodate the elongated evaporator sections 24 of the heat pipe assembly 16. The inlet port 18 is connected to the convection heat transfer chamber 12 by means of an inlet transition shroud 26, and the exhaust port is connected to the convection heat transfer chamber by means of an exhaust transition shroud 28. The housing 11 and convection heat transfer chamber 12 are supported at an upright position on a support skid or foundation frame 30. The steam boiler tank 14 is supported in an elevated position on the skid 30 by means of vertical I-beams 32, horizontal I-beams 34, and angle plates 36 in a position directly adjacent to the convection heat transfer chamber 12 and overlying the inlet transition shroud 26 and inlet port 18. This particular physical arrangement of the major components of the heat recovery system 10 is required because of the elongated geometry of the heat pipe assembly 16 and the requirement that the condenser section of each heat pipe be physically enclosed within the steam boiler tank 14.

The steam boiler tank 14 is generally cylindrical in construction and includes hemispherical end covers 38 welded at each end. According to a typical arrangement, the waste heat recovery system is designed to produce $2 \times 10^6$ BTU per hour of saturated steam at 100 psi. Therefore a conventional construction material such as mild steel may be utilized to construct the steam boiler tank 14 for operation in this pressure range including a conservative pressure safety factor.

The steam boiler tank 14 is equipped with a conventional relief valve 40, pressure gauge 41, and a steam discharge pipe 42 for conveying steam 43 is disposed along the upper top surface of the tank. Also, the steam boiler tank 14 is equipped with a water level control 44 which includes a sight glass 56 and a low water cut-off transducer 48.

A condensate collecting tank 50 is filled by condensate 51 through a condensate return line 52 from the process which utilizes the steam generated by the system which may be, for example, a steam turbine driven alternating current generator (not shown). In certain situations, supplemental makeup water may be required where an insufficient amount of condensate is available. For this situation a separate water preheater (not shown) would be economical. Condensate or makeup water accumulated in the collecting tank is conveyed to the boiler tank 14 by means of a water pump 54 and a fill line 56 which projects through the side of the steam boiler tank 14 and directs the flow downwardly as indicated by the arrow 58 as can best be seen in FIGS. 1 and 2 of the drawing. This flow arrangement for water discharged into the steam boiler tank 14 helps create circular current flow within the volume of water 62 in cooperation with movement of bubbles of steam rising from the condenser end portions of the heat pipe assembly 16 as indicated by the arrow 64. The circular flow of currents within the volume of water 62 provides that incoming water will be mixed uniformly within the boiler tank thereby promoting the production of steam at a relatively constant rate. Furthermore, this inlet arrangement mixes the incoming water so that no cold streams flow directly onto weld areas which are sensitive to thermal shock.

An important feature of the steam boiler tank 14 is the provision of a pressure header plate 66 in a rectangular opening in one side of the tank. The pressure header plate 66 serves as the interface between the condenser section of the heat pipe assembly 16 which is enclosed entirely within the steam boiler tank 14 and the evaporator section of the heat pipe assembly which projects into the convection heat transfer chamber 12. Each heat pipe of the heat pipe assembly 16 passes through a circular opening within the pressure header plate 66 and is joined to the surrounding portions of the pressure header plate by means of a thermal sleeve which will be discussed in detail hereinafter. The fluid-tight seal produced by this arrangement ensures that the heated waste gas stream and the water will be physically isolated from each other, and that the loss of heat through the header plate will be minimized.

Figures 8, 9:
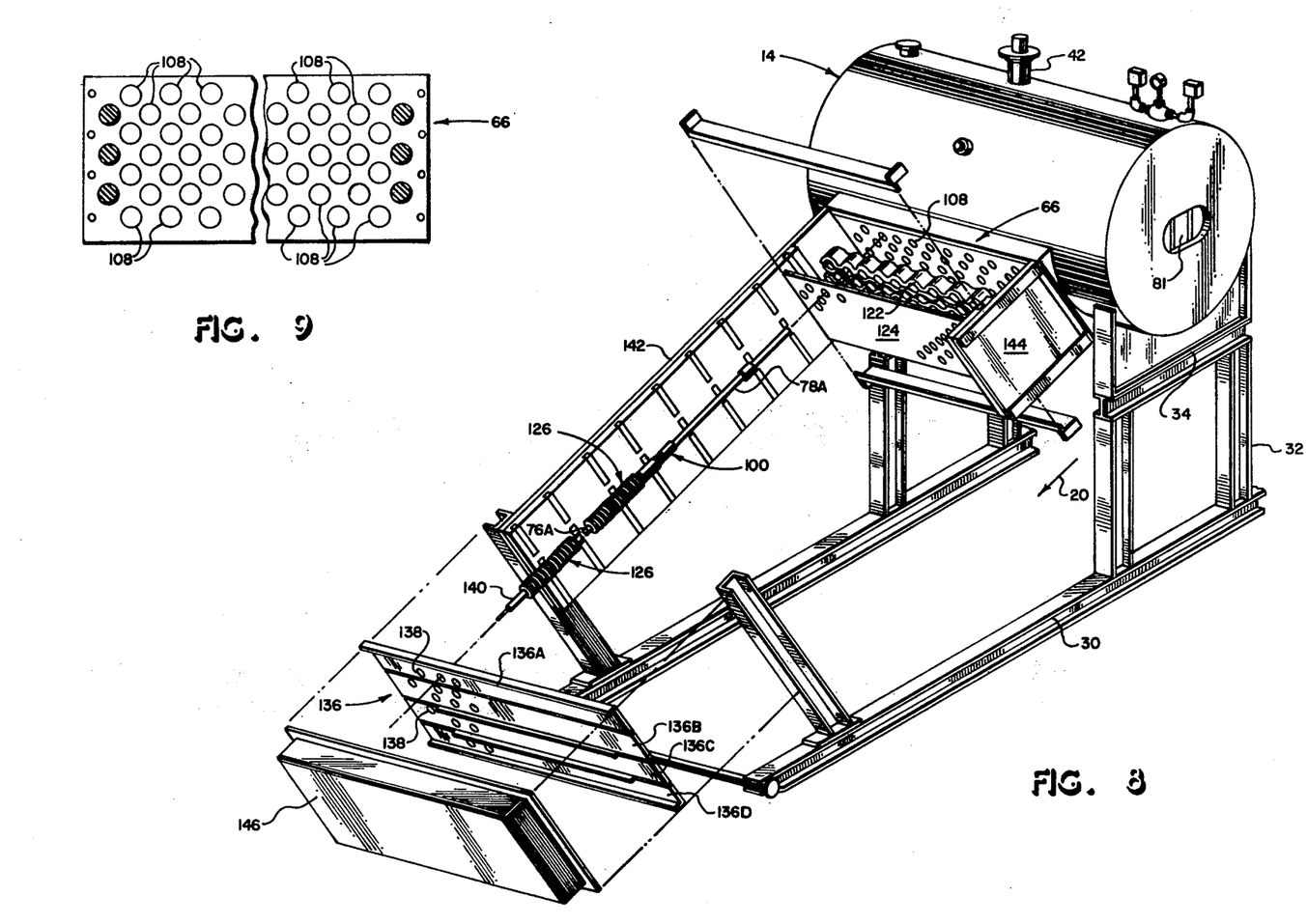

Referring now to FIGS. 1-4, the heat pipe assembly 16 comprises a rectilinear array of heat pipes 68 which are arranged in rows and columns according to a staggered heat pipe opening pattern as can best be seen in FIG. 9. The heat pipes 68 have a construction similar to that illustrated in FIG. 4 and as described in U.S. Pat. No. 4,020,898 by George M. Grover and assigned to the assignee of the present invention, which is hereby incorporated by reference. Other heat pipe constructions such as illustrated in U.S. Pat. No. 3,865,184 by George M. Grover and assigned to the assignee of the present invention, which is hereby incorporated by reference, may also be used to good advantage.

Figure 4:
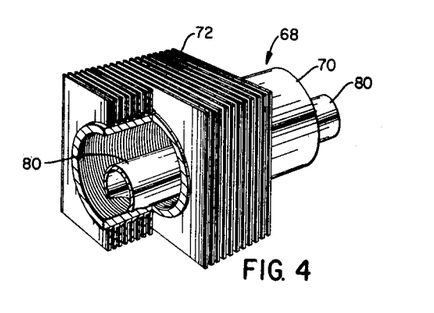
FIG. 4 is an isometric view of a portion of a heat pipe assembly utilized in the present invention.

The preferred heat pipe of the present invention is indicated generally at 68 in FIG. 4 of the drawing. The heat pipe includes an outer tubular envelope 70 which is typically a tubular member having a length many times greater than its cross-sectional width. The outer tubular envelope 70 will be at least about eight feet in length and will have an inside diameter of about one-half to one inch. Such dimensions are mentioned as being typical only, it being understood that the overall length and diameters of such heat pipes can vary over wide ranges depending upon the particular application. While the illustrated heat pipe 68 is shown having a generally cylindrical tubular member 70 as the outer tubular envelope, it is to be understood that various other geometric shapes may be utilized such as rectangular or square cross-sectional tubular members. However, it has been found that the cylindrical tubular member 70 can be readily and economically formed into the heat pipe 68 for use in this invention. Normally, the outer tubular member 70 is fabricated from a thermally conductive material such as copper, aluminum, or steel and the like, in order that thermal energy can be passed into and out of the interior of the heat pipe through the walls of the outer tubular member 70.

Figure 6:
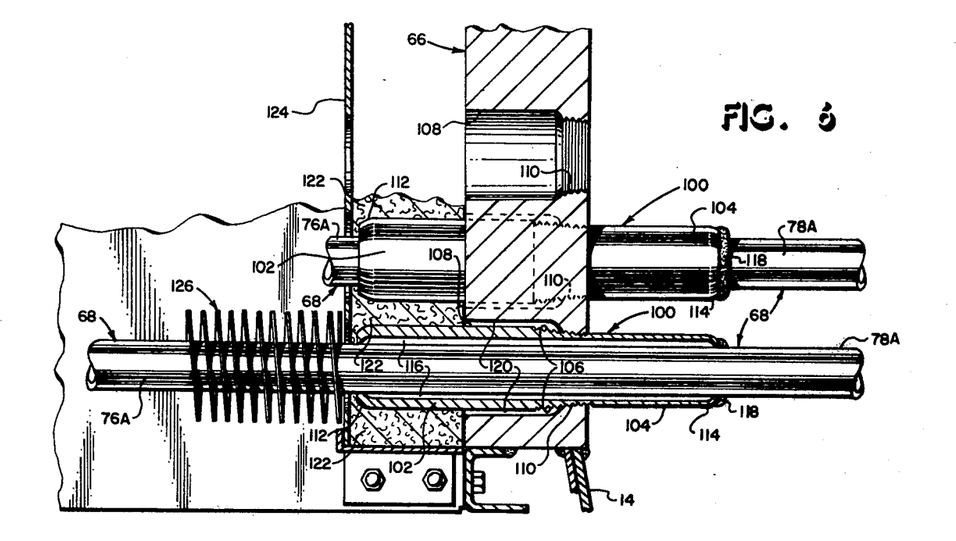
FIG. 6 is a sectional view of the header plate/heat pipe interface of the waste heat recovery system shown in FIG. 5.
Figure 7:
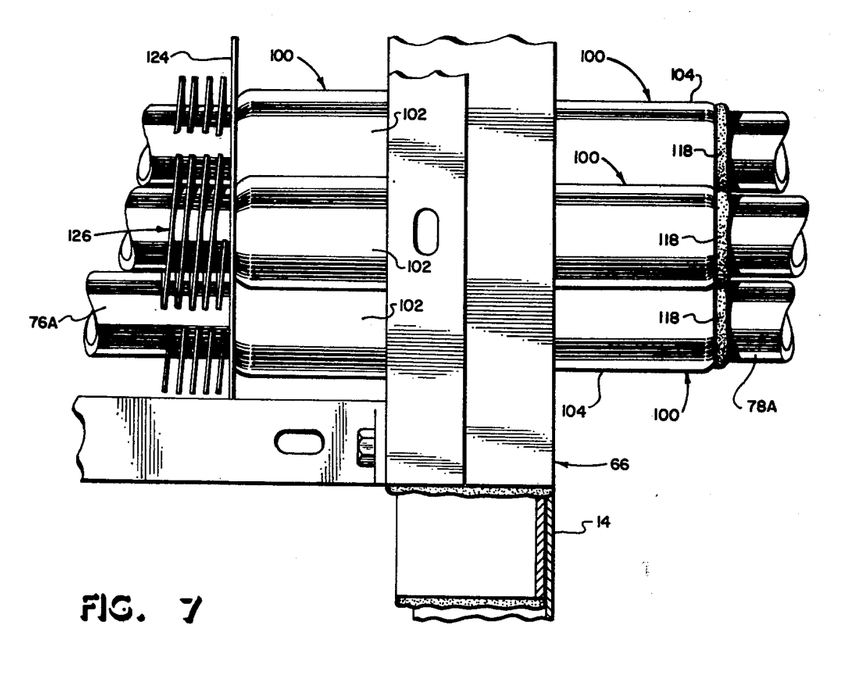
FIG. 7 is an elevation view of an assembly of heat pipes supported in a header plate according to the teachings of the present invention; and, FIG. 8 is an exploded view, in perspective, of the heat recovery system shown in FIG. 5, which illustrates the assembly method of the invention.

A plurality of conventional, thermally conductive heat exchanger fins 72 can be mounted at axially spaced points on the exterior of the tubular envelope 70 in such a manner as to provide good heat transfer between the fin and the envelope. This increases the effective area over which convection heat transfers occurs. Such fins have been found to increase the thermal energy transfer efficiency especially for gaseous stream-to-wall transfer. The fins can usually be eliminated where the heat exchange is made with a liquid rather than a gas. In the modular heat pipe assembly 16 as shown in FIG. 2, each of the evaporator sections 24A, 24B, and 24C contain progressively more heat exchanger fins 72 to achieve uniform heat transfer since the temperature of the heated waste gas stream decreases as it passes through each modular section. In selecting a fin arrangement, the hot gas entrained solids should be considered in selecting the external fin configuration. Natural gas fueled gas turbines produce a very clean exhaust, consequently high, closely spaced fins may be used, up to a fin spacing of ten fins per inch. Fin height, while adding to total surface, reduces fin efficiency because of the longer thermal path. High fins also increase through flow area or gas passage area. While the fins illustrated in FIG. 4 are rectangular, it is to be understood that other geometric shapes including circular as shown in FIG. 6 may be used to good advantage. All of these factors must be balanced in a design for the most effective use of the heat pipes.

In the present example, the heat pipes 68 are typically one inch O.D. carbon steel arranged on two inch centers and two inches between rows in a staggered array as can best be seen in FIGS. 1 and 3 of the drawing. Preferably, eight fins 72 of 0.024 inch mild steel with an aluminized surface are crimped onto the outer tubular member 70. As discussed above, it may be desirable to have a different number of fins in each of the modular sections, therefore the spacing will be different for each section when a modular array is constructed. The opposite ends of the tubular member 70 are hermetically sealed by end caps 74. In the construction of the heat pipe, the tubular envelope 70 is evacuated through a fitting provided on the end cap 74. Thereafter, the envelope 70 is filled with a liquid phase/vapor phase working fluid (not shown) such as a commercial refrigerant R12 or toluene. The end cap 74 is then permanently sealed by crimping, soldering or welding.

Any known working fluid that will exist in both a liquid and vapor phase under the operating temperatures and pressures can be utilized in the present invention. Thus, working fluid such as water, aliphatic hydrocarbons, aromatic hydrocarbons, halogen substituted materials, such as freon, refrigerants and the like, can be used. Particularly preferred working fluids are the freon compounds such as refrigerant R12, benzene, toluene and the like.

The quantity of working fluid that is utilized in the heat pipe has been found to be relatively important for efficient operation. It has been determined that the heat transfer capability of the heat pipes 68 is maximized if the quantity of the working fluid in the heat pipe is such that the liquid phase is present in an amount of from about 40 to about 75 percent of the volume of the tubular envelope 22 at the desired operating temperatures.

The end portions of each heat pipe 68 which extend into the convection heat transfer chamber 12 collectively constitute an evaporator section as indicated by the dashed line 76. The opposite end sections of each heat pipe 68 which extend into the steam boiler tank 14 collectively constitute a condenser section for the heat pipe assembly 16 as illustrated by the dashed line 78 as can best be seen in FIG. 2 of the drawing. The heat pipe assembly 16 transfers very large quantities of thermal energy between the evaporator section 76 and the condenser section 78 by the closed cycle circulation of the working fluid as it is vaporized in the evaporator section and moves to the condenser section where it is condensed and returns to the evaporator.

It has been discovered that the magnitude of the thermal energy which can be exchanged for a given array of heat pipes can be increased by elevating the condenser section 78 at an angle theta ($\theta$) with respect to the evaporator section 76 as shown in FIG. 2. According to this arrangement, at least a portion of the working fluid liquid contained within the evaporator section will be vaporized and the vaporized portion will rise to the relatively cool condenser section of the heat pipe assembly where it is condensed and returns by gravity flow. Because of the phase change of the working fluid from a liquid to a vapor and then back to a liquid, large quantities of thermal energy are transferred between the evaporator section and the condenser section of the heat pipe.

It is preferred that the heat pipes 68 of the heat pipe assembly 16 generally comprise straight tubular pipes. In this preferred embodiment, the heat pipes 68 in the heat pipe assembly 16 are disposed in parallel with each other and the assembly is oriented whereby the axis of each heat pipe will be inclined at an angle theta ($\theta$) above the horizontal to position the condenser section 78 above the evaporator section 76 (see FIG. 2). It has been determined that the preferred range of the angle of inclination is between about 15 degress to about 35 degrees above the horizontal.

Referring again to FIG. 4, a liquid phase return conduit or flow separator 80 is disposed within the tubular envelope 70 and extends from the evaporator section 76 to the condenser section 78. The liquid phase return conduit 80 is a conduit that preferably has open ends to allow liquid phase working fluid to flow into the upper end of the liquid phase return conduit and then downwardly through the conduit to exit out the lower open end of the conduit into the evaporator section of the heat pipe. Thus the liquid phase of the working fluid that is either swept or transported upwardly into the condenser section 78, as well as the liquid phase which forms upon the condensation of the vaporized working fluid in the condenser section, will enter the open end of the liquid phase return conduit 80 and will flow by gravity downwardly to the evaporator section wherein additional thermal energy, passing through the walls of the evaporator section, will cause evaporation of a portion of the working fluid with the vaporized portion flowing upwardly to the condenser section 78 in the space surrounding the outside of the liquid phase return conduit.

It has been determined that the heat pipe-flow separator combination described above is characterized by two distinctly different operating modes depending upon the angle of inclination of the heat pipe relative to the horizontal. These two operating modes are the evaporation/condensation mode and the "bubble" mode in which long bubbles of vapor displace slugs of liquid from the evaporator section to the condenser section. This reduces the vapor transport because the velocity of the bubbles is substantially less than that of a pure vapor stream. On the other hand, the transport of liquid is greatly increased. Since there is a finite temperature drop along the pipe, there is a large increase in the sensible heat transferred to compensate for the decrease in latent heat transfer associated with the decreased vapor being transported. For angles of inclination up to about 35° the heat pipe-flow separator combination operates in the evaporation/condensation mode, has good efficiency and a capacity several times greater than the non-flow separator heat pipe. At higher angles of inclination the capacity increases more slowly. For the waste heat boiler described herein, the temperature difference between the waste heat gas stream and the desired steam temperature is small, therefore high efficiency is desirable, and operation at angles of inclination at or below 35° is preferred.

Thus, it will be appreciated that vaporized portions of the working fluid, along with some of the liquid phase working fluid, will flow upwardly in the space outside of the liquid phase return conduit while only liquid phase working fluid will flow downwardly through the liquid phase return conduit. This distinct pattern is achieved by utilizing the liquid phase return conduit 80 which provides a separate flow path with respect to the outer tubular envelopes 70, thereby thermally isolating the walls of the outer tubular envelope 70 with respect to the condensate working fluid which is conveyed through the liquid phase return conduit 80. The liquid phase return conduit 80 is, of course, not a pressure member and may be formed of any suitable material, such as thin walled metal tubes of copper, aluminum, steel or the like. The preferred length of the liquid phase return conduit 80 is from about 65 to about 85 percent of the length of the interior of the outer tubular envelope 70. In some instances, especially at higher angles of inclination, the liquid phase return conduit 80 can be shortened somewhat in the evaporator section and may extend into the evaporator section for a distance of down to about 15 percent of the length of the evaporator section.

Under ideal conditions, the heated waste gas stream 20 would be provided by a clean source of hot air. However, in a practical application of the present invention it should be expected that the heated waste gas 20 will be composed of air, combustion products, ash carryover, and other contaminants. Therefore, the heat pipe assembly 16 must be cleaned periodically to prevent fouling of the heat transfer fins 72. Conventional soot blowers (not shown) can be utilized for this purpose. For cleaning the interior of the steam boiler tank 14, one of the hemispherical end covers 38 may be provided with a bolted flange access plate 81 as shown in FIG. 8 to permit quick removal for cleaning and inspection of the condenser assembly 78.

Flow of the heated waste gas stream 20 through the convection heat transfer chamber 12 is regulated by means of a face damper assembly 82, a bypass damper assembly 84 and an ambient air damper assembly 86. The face damper and bypass damper assemblies are substantially identical in construction and include a number of adjustable vanes 88 which are generally horizontally disposed within the convection heat transfer chamber 12. The face damper 82 assembly extends beneath the evaporator section 76 of the heat pipe assembly 16 and when closed completely blocks the flow of air through the evaporator section. Operation of the face damper assembly 82 in the closed position is desirable in an emergency situation brought about by a low water or a high pressure cutout alarm. When this occurs, the face damper assembly is closed and the bypass damper 84 is completely opened thereby permitting the heated gas stream 20 to flow around the evaporator section 76 and through the exhaust port 22 substantially without exchanging heat transfer by causing turbulent flow of the heated gas stream 20 through the evaporator section 76.

According to another important feature of the invention, the ambient air damper assembly 86 is provided in order to admit the flow of ambient air as represented by the arrow 90 in FIG. 1 into the convection heat transfer chamber 12 when it is desired to reduce the temperature of the incoming heated waste gas stream 20 and also to increase the mass flow across the evaporator section 76.

As previously discussed, it is expected that the temperature difference between the waste heat gas stream and the desired steam temperature will be relatively small, therefore high efficiency operation of the heat pipes is desirable. To obtain high efficiency, it is essential that heat losses at the heat pipe/header plate interface be minimized. Reduction of heat transfer through the heat pipe/header plate interface has been a problem in conventional arrangements because of the relatively large interface area between the thick header plate wall and the heat pipe. The header plate 66 must be relatively thick as compared with the thickness of the boiler vessel wall 14 because of the large number of heat pipe openings which are formed in the header plate. The header plate must be thicker than usual in order to comply with the strength and pressure requirements of the ASI code for boiler construction. Additionally, a fluid-tight seal which will withstand the internal pressure developed within the boiler tank must be established while also minimizing the rate of heat transfer through the header plate. Finally, the heat pipes must be supported so that the condenser and evaporator end portions are free to expand and contract axially in response to thermal cycling.

Referring now to FIGS. 5, 6, 7 and 8, the foregoing objects are achieved by interposing a thermal support sleeve 100 between the heat pipe and the header plate in an indirect supporting and sealing arrangement. The thermal support sleeve 100 is a relatively short length of mechanical tubing having a large diameter end portion 102, a small diameter end portion 104 and a tapered, threaded midsection 106. Each thermal support sleeve 100 extends through a heat pipe opening 108 in the header plate 66. The heat pipe opening 108 is reduced by a stepped bore 110 which is tapered and threaded for engaging the tapered, threaded sleeve midsection 106. The large and small diameter end portions 102, 104 have swaged ends 112, 114 which circumscribe and engage the heat pipe 68 on opposite sides of the header plate, respectively.

According to a preferred arrangement, the inside diameter of the thermal support sleeve 100 is slightly greater than the outside diameter of the heat pipe 68 whereby the heat pipe 68 is radially separated from the surrounding thermal support sleeve by an annular air gap 116. The annular air gap 116 provides a thermal barrier between the heat pipe and the thermal sleeve along the length of the thermal sleeve, thereby limiting contact and heat transfer to the swaged end portions 112, 114. The swaged end portions 112, 114 engage the heat pipe in substantially line contact at opposite ends, thereby presenting a relatively small thermal path between the heat pipe and the surrounding sleeve.

According to a preferred embodiment of the invention, the heat pipe 68 is sealed to the header plate 66 indirectly through the tapered union of the threaded sleeve midsection 106 and stepped bore 110, and by a weld bead 118 which seals the swaged end 114 against the condenser section 78A which extends into the boiler tank. The union of the swaged end 114 with the condenser section 78A is preferably at a point remote from the threaded union of the sleeve midsection and stepped bore. The threaded union of the support sleeve section with the stepped bore in combination with the weld bead provide a fluid-tight seal having high thermal resistance. The thermal sleeve supports the heat pipe at a single fixed point which permits free axial expansion and contraction of the heat pipe in response to thermal cycling.

The heat pipe opening 108 is preferably slightly larger than the outside diameter of the large diameter sleeve end portion 102 thereby separating the support sleeve away from the header plate 106 along the depth of the heat pipe opening. This arrangement produces an annular air gap 120 which is concentric with the annular air gap 116. This arrangement further reduces the loss of heat from the heat pipe through the support sleeve to the header plate.

The exterior surface of the header plate 66 and the large diameter end portions 102 of the heat pipes are further insulated by strips of insulation 122 which are applied in layers between the rows of heat pipes and adjacent the exterior surface of the header plate 66. The strips of insulation 122 are held in place by a retainer sheet 124.

Referring now to FIGS. 6 and 8, the heat pipes 68 are prepared for installation into the header plate 66 by first attaching the thermal support sleeve 100 to the heat pipe 68. The thermal support sleeve 100 is slipped onto the heat pipe 68 until the support sleeve is coincident with the intermediate section of the heat pipe which lies between the evaporator section 76A and the condenser section 78A. The swaged end 114 on the small diameter end portion 104 of the support sleeve is then sealed to the condenser section 78A by the weld bead 118. Next, a spiral fin assembly 126 is crimped onto the evaporator section 76A. The heat pipe assembly including the thermal sleeve and spiral fin is then inserted through the retainer sheet 124 and into the heat pipe openings 108. The tapered, threaded midsection 106 of the sleeve 100 engages the threads of the stepped bore 110 as the heat pipe assembly is advanced into the interior of the boiler tank 14. The sleeve is tightened against the stepped bore until the desired torque level is established.

Figure 5:
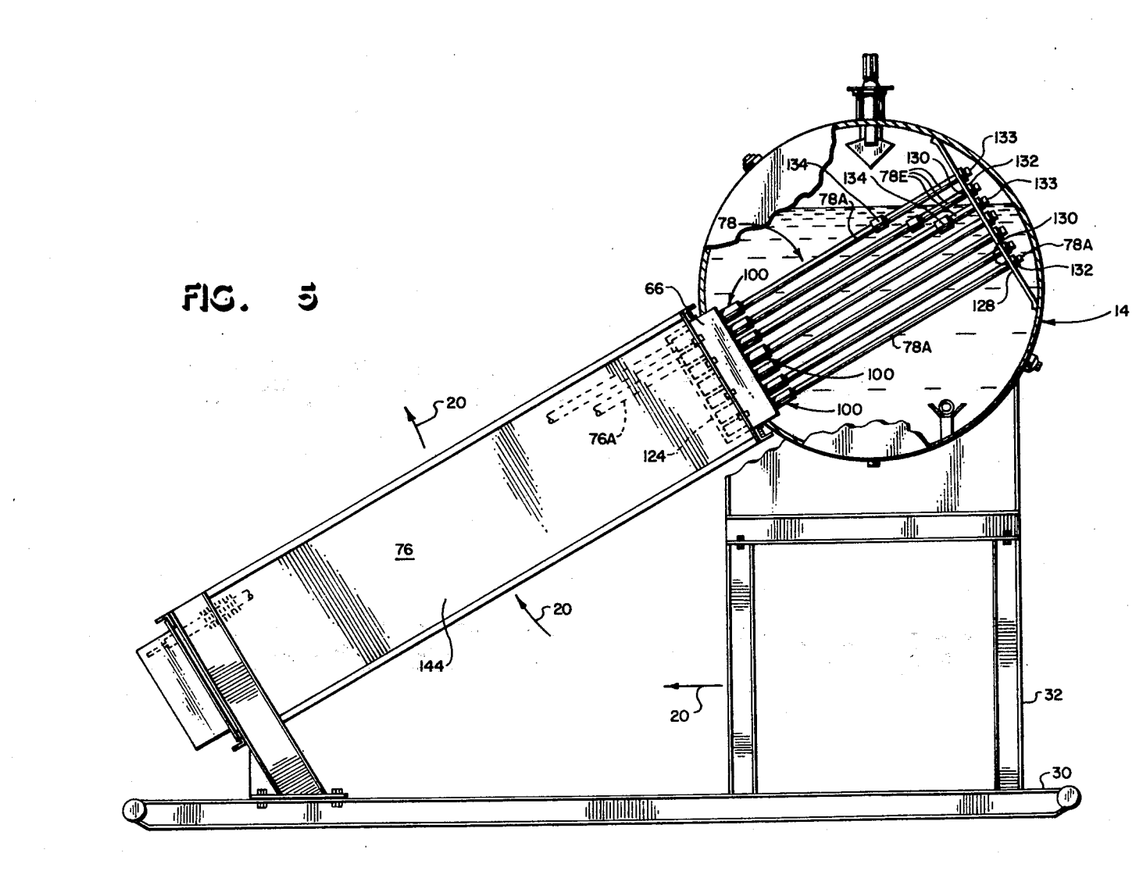
FIG. 5 is a left side elevation view, partly broken away, of the heat recovery system shown in FIG. 1.

According to an important feature of the invention, an end support bracket 128 is secured to the interior sidewall of the boiler tank as can best be seen in FIG. 5. The end support bracket 128 has a plurality of expansion openings 130 through which the condenser sections 78A project. The expansion openings 130 are preferably formed by a slip collar 132 which is secured to the support bracket 128. The expansion openings 130 are disposed in axial alignment with the heat pipe openings 108. The thermal sleeve 100 provides axial alignment of the heat pipe 68 as the condenser sections enter the expansion openings 130. Additionally, the access plate 81 can be removed from the side of the boiler tank to assist in the insertion of the heat pipe condenser capped end sections 133 through the expansion openings. The condenser end sections are slidably engaged with the slip collars 132 whereby the condenser sections 78A are free to move in axial extension and retraction in response to thermal cycling. Because the heat pipes are supported at only one fixed point, that is, the swaged end portion 114 at the weld bead 118, sectional seizure or axial binding do not occur. The heat pipes are preferably installed in one or two horizontal rows at a time, with the insulation strips 122 being inserted around the heat pipes in single layers as shown in FIG. 8.

It is to be expected that portions of the heat pipe condenser sections will extend above the minimum expected water line elevation as shown in FIG. 5. The minimum water line elevation is indicated by the reference numeral 134. The water line level 134 is maintained substantially constant by adding additional feed water as previously discussed. Because the condenser end portions will be operated at a temperature level exceeding 600° F., a selected number of the upper rows of the heat pipes are terminated at an elevation below the minimum expected water line elevation. Circulation of the working fluid is confined within the submerged condenser sections in order to prevent heat damage. According to this arrangement, the condenser end portions of the top three rows are terminated at a level below the minimum expected water line elevation and are connected to an open heat pipe extension 78E which extends through the slip collars 132 for support purposes. The heat pipe extensions 78E are connected to the sealed condenser end portions by means of a coupling collar 134.

Referring again to FIG. 8, the evaporator sections are supported for axial displacement by an end support bracket assembly 136. The end support bracket 136 has an array of expansion openings 138 for receiving the capped end portions 140 of the evaporator section 76A. The end support bracket assembly 136 includes separate brackets 136A, 136B, 136C and 136D which are arranged in a vertical stack so that one or two rows of heat pipes at a time can be assembled through the header plate. The evaporator assembly 76 is enclosed by side panels 142, 144 and an end panel 146. The under side and top side of the evaporator section 76 are open for receiving the hot gas stream 20.

From the foregoing discussion, it will be appreciated that the present invention comprises a unique waste heat recovery system having substantially improved operating characteristics over conventional systems. The modular arrangement of the heat pipe assembly 16 permits each evaporator section 24A, 24B and 24C to contain different numbers of fins 72. Since the temperature of the heated waste gas stream 20 decreases as it passes through each modular evaporator section of the evaporator 76, the first evaporator section 24A will need fewer fins 72 than the last evaporator section 24C in order that the heat pipes in each evaporator section will transfer substantially the same quantity of heat. This freedom of choice of fin area for the modular evaporator sections permits many evaporator sections to be stacked so that the amount of heat transferred from the waste gas stream can be maximized.

Another important advantage over the prior art is that the heat pipes extend freely into the boiler tank 14 and are sealed indirectly through the thermal sleeves 100 to the header plate 66 which permits free expansion without mechanical strain. The thermal sleeves also reduce heat losses due to the concentric annular air gap spacing and high thermal resistance of the thin walled sleeve. Furthermore, the outside portions of the heat pipes in the condenser section can be grooved or knurled to provide a heat transfer surface which enhances nucleate boiling of the water at the heat transfer surface. Because the heat pipes are not terminated in a manifold, it is possible to clean their heat transfer surfaces at regular maintenance intervals to keep the heat transfer surface in excellent condition.

For certain applications, the boiler tank 14 may be used for purposes other than steam production. For instance, the system may be used for vaporization of a flammable working fluid such as toluene for a waste heat Rankine cycle power system which requires complete isolation from the heated gas stream. Otherwise there would be an extremely hazardous possibility of venting the flammable material into the hot gas stream in the event of a leak of the system. Complete isolation is provided by the sealed union of the header plate 66 with each of the thermal support sleeves 100. Additionally, the heat pipes 68 are closed at their end portions and operate at relatively low pressures.

Although a preferred embodiment of the invention has been described in detail, it should be understood that various changes, substitutions, and alterations can be made therein without departing from the spirit and scope of the invention as defined by the appended claims.

What is claimed is:

1. A method for connecting the sealed interior of a boiler tank in thermal communication with a convection heat transfer chamber comprising:
    installing a header plate having a heat pipe opening within the sidewall of the boiler tank;
    extending the condenser end portion of a heat pipe through the heat pipe opening into the interior of the boiler tank with the evaporator end portion extending into the convection heat transfer chamber;
    interposing a thermal support sleeve between the heat pipe and the header plate whereby the heat pipe is supported in radially spaced relation within the thermal sleeve;
    connecting the midsection of the thermal support sleeve in sealed engagement with the header plate; and,
    connecting an end portion of the thermal sleeve in sealed engagement with the condenser end of the heat pipe.

2. The method as defined in claim 1, including the pre-assembly steps of:
    wicking the inside of the heat pipe with a tool;
    crimping heat transfer fins into the evaporator end of the heat pipe;
    assembling the thermal support sleeve around the heat pipe adjacent the heat transfer assembly;
    welding the thermal sleeve to the condenser end of the heat pipe; and,
    sealing a volume of working fluid within the heat pipe.

3. The method as defined in claim 1 including the step of covering the header plate and the external surface of the thermal support sleeve with a layer of thermal insulation.

4. The method as defined in claim 1 including the step of slidably engaging the condenser end portion of the heat pipe with a support bracket mounted within the boiler tank.

5. The method as defined in claim 1, including the step of terminating the condenser section at an elevation below the minimum expected water line elevation.

* * * * *